United States Patent
Tandon et al.

(10) Patent No.: US 11,778,240 B2
(45) Date of Patent: Oct. 3, 2023

(54) BANDING ARTIFACT DETECTION IN IMAGES AND VIDEOS

(71) Applicant: NETFLIX, INC., Los Gatos, CA (US)

(72) Inventors: Pulkit Tandon, Stanford, CA (US); Mariana Fernandez Afonso, Santa Clara, CA (US); Joel Sole Rojals, San Diego, CA (US); Lukas Krasula, Campbell, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 17/351,955

(22) Filed: Jun. 18, 2021

(65) Prior Publication Data

US 2022/0239953 A1 Jul. 28, 2022

Related U.S. Application Data

(60) Provisional application No. 63/141,827, filed on Jan. 26, 2021.

(51) Int. Cl.
*H04N 19/86* (2014.01)
*H04N 19/182* (2014.01)
*H04N 19/117* (2014.01)

(52) U.S. Cl.
CPC ........... *H04N 19/86* (2014.11); *H04N 19/117* (2014.11); *H04N 19/182* (2014.11)

(58) Field of Classification Search
CPC ..... H04N 19/86; H04N 19/117; H04N 19/182
USPC .................................................... 375/240.29
See application file for complete search history.

(56) References Cited

U.S. PATENT DOCUMENTS

2009/0304270 A1* 12/2009 Bhagavathy ........... H04N 1/409
382/162
2011/0129020 A1* 6/2011 Li .......................... G06T 5/002
375/E7.19

OTHER PUBLICATIONS

Zhengzhong Tu, Jessie Liny, Yilin Wang, Balu Adsumilli, and Alan C. Bovik "Bband Index: A No-Reference Banding Artifact Predictor", IEEE Transaction on Image Processing, vol. 20, No. 8, pp. 2110-2121, 2020 (Year: 2020).*
Yilin Wang, Sang-Uok Kum, Chao Chen, Anil Kokaram, "A Perceptual Visibility Metric for Banding Artifacts", IEEE International Conference on Image Processing "ICIP", 2016 (Year: 2016).*
Innfam Yoo, Xiyang Luo, Yilin Wang, Feng Yang, Peyman Milanfar, "GIFnets: Differentiable GIF Encoding Framework", IEEE Conference on Computer Vision and Pattern Recognition "CVPR", 2020 (Year: 2020).*
Chen et al., "An Overview of Core Coding Tools in the AV1 Video Codec", Picture Coding Symposium, IEEE, 2018, pp. 41-45.
Wang et al., "Image Quality Assessment: From Error Visibility to Structural Similarity", IEEE Transactions on Image Processing, DOI 10.1109/TIP.2003.819861, vol. 13, No. 4, Apr. 2004, pp. 600-612.

(Continued)

*Primary Examiner* — Ayman A Abaza
(74) *Attorney, Agent, or Firm* — Artegis Law Group, LLP

(57) ABSTRACT

A banding detection application generates a first set of pixel confidence values based on a first intensity difference value and first image scale associated with a first image, wherein each pixel confidence value included in the first set of pixel confidence values indicates a likelihood that a corresponding pixel included in the first image at the first image scale corresponds to banding in the first image. The banding detection application then generates a banding index corresponding to the first image based on the first set of pixel confidence values.

19 Claims, 6 Drawing Sheets

(56) References Cited

OTHER PUBLICATIONS

Li et al., "Toward a Practical Perceptual Video Quality Metric", The Netflix Tech Blog, Jun. 6, 2016, at https://netflixtechblog.com/toward-a-practical-perceptual-video-quality-metric-653f208b9652, 22 pages.

Wang et al., "A Perceptual Visibility Metric for Banding Artifacts", 2016 IEEE International Conference on Image Processing (ICIP), 2016, pp. 2067-2071.

Tu et al., "Bband Index: A no-reference banding artifact predictor", ICASSP 2020-2020 IEEE International Conference on Acoustics, Speech and Signal Processing (ICASSP), 2020, pp. 2712-2716.

Bhagavathy et al., "Multiscale Probabilistic Dithering for Suppressing Contour Artifacts in Digital Images", IEEE Transactions on Image Processing, DOI 10.1109/TIP.2009.2022293, vol. 18, No. 9, Sep. 2009, pp. 1936-1945.

Baugh et al., "Advanced Video Debanding", Proceedings of the 11th European Conference on Visual Media Production, http://dx.doi.org/10.1145/2668904.2668912., Nov. 13-14, 2014, pp. 1-10.

Jin et al., "Composite Model-Based DC Dithering for Suppressing Contour Artifacts in Decompressed Video", IEEE Transactions on Image Processing, DOI 10.1109/TIP.2011.2114356, vol. 20, No. 8, Aug. 2011, pp. 2110-2121.

Wang et al., "Multi-scale Dithering for Contouring Artefacts Removal in Compressed UHD Video Sequences", 2014 IEEE Global Conference on Signal and Information Processing (GlobalSIP), IEEE, 2014, pp. 1014-1018.

Daly et al., "Decontouring: Prevention and removal of false contour artifacts", Human Vision and Electronic Imaging IX, International Society for Optics and Photonics, vol. 5292, 2004, pp. 130-149.

Lee et al., "Two-Stage False Contour Detection Using Directional Contrast Features and Its Application to Adaptive False Contour Reduction", IEEE Transactions on Consumer Electronics, vol. 52, No. 1, Feb. 2006, pp. 179-188.

Huang et al., "Understanding and Removal of False Contour in HEVC Compressed Images", IEEE Transactions on Circuits and Systems for Video Technology, DOI 10.1109/TCSVT.2016.2607258, vol. 28, No. 2, 2016, pp. 378-391.

Tomar, Suramya, "Converting Video Formats with FFmpeg", Linux Journal, vol. 2006, No. 146, Apr. 28, 2006, available at https://www.linuxjournal.com/article/8517, 7 pages.

Seshadrinathan et al., "Chapter 21—Image Quality Assessment", The Essential Guide to Image Processing, Available: http://www.sciencedirect.com/science/article/pii/B9780123744579000214, A. Bovik, Ed. Boston: Academic Press, 2009, pp. 553-595.

Yoo et al., "GIFnets: Differentiable GIF Encoding Framework", Proceedings of the IEEE/CVF Conference on Computer Vision and Pattern Recognition, 2020, pp. 14473-14482.

Denes et al., "A visual model for predicting chromatic banding artifacts", Electronic Imaging, https://doi.org/10.2352/ISSN.2470-1173.2019.12.HVEI-212, vol. 2019, No. 12, 2019, pp. 212-1:212-7.

Monaci et al., "Color Contrast Detection in Spatial Chromatic Noise", Diploma Project, EPFL, Aug. 2002, available at https://infoscience.epfl.ch/record/86874, 104 pages.

Recommendation, "ITU-T P.913", ITU, Series P: Terminals and Subjective and Objective Assessment Methods, Mar. 2016, 44 pages.

Krasula et al., "On the accuracy of objective image and video quality models: New methodology for performance evaluation", 2016 Eighth International Conference on Quality of Multimedia Experience (QoMEX), IEEE, 2016, pp. 1-6.

International Search Report for application No. PCT/US2022/013692 dated May 16, 2022.

* cited by examiner

BANDING ARTIFACT DETECTION IN IMAGES AND VIDEOS

CROSS-REFERENCE TO RELATED APPLICATIONS

This application claims the priority benefit of the United States Provisional Patent Application titled, "CONTRAST-AWARE MULTI-SCALE BANDING INDEX," filed on Jan. 26, 2021 and having Ser. No. 63/141,827. The subject matter of this related application is hereby incorporated herein by reference.

BACKGROUND

Field of the Various Embodiments

The various embodiments relate generally to computer science and video and image processing and, more specifically, to techniques for banding artifact detection in images and videos.

Description of the Related Art

To efficiently deliver images and/or videos to playback devices, a media service provider oftentimes processes the images and/or videos and transmits the processed images and/or videos to the playback devices. However, due to the processing, the visual quality of a processed image or video is typically not as good as the visual quality of the source image or video. For example, when an image having a large area with a smooth gradient is processed using techniques that quantize pixel values, such as bit-depth conversion or encoding, a visual artifact known as "banding" can be produced in the processed image. Banding can cause the large area included in the source image to appear as having discrete "bands," as opposed to having a smooth gradient.

One approach to detecting banding artifacts in processed image is to implement a false edge detection technique or a false segment detection technique during the encoding process. With a false edge detection technique, edge detection operations are performed on both the source image and the processed image to identify edges in both the source image and in the processed image. The identified edges are compared to determine whether the processed image contains edges that are not present in the source image. Potential banding artifacts are identified based on the edges contained in the encoded image that are not contained in the source image. With a false segment detection technique, segmentation operations are performed on both the source image and the processed image to identify segments in both the source image and the processed image. The identified segments are compared to determine whether the processed image contains segments that are not contained in the source image. Potential banding artifacts are identified based on the segments contained in the encoded image that are not present in the source image.

One drawback with the above techniques is that neither false edge detection nor false contour detection can detect banding artifacts with high accuracy. First, false edge detection and false segment detection may incorrectly identify elements of the image as potential banding artifacts. With a false edge detection technique, an edge identified as a potential banding artifact may correspond to an edge depicted in the image rather than to an actual banding artifact. With a false segment detection technique, a segment identified as a potential banding artifact may correspond to a segment depicted in the image rather than to an actual banding artifact. Second, false edge detection and false segment detection may not successfully detect edges or segments, as the case may be, that correspond to banding artifacts. Because the values of pixels in and around a banding artifact may be very similar, edge detection operations may not successfully detect any edges around the banding artifact. Similarly, segment operations may not successfully segment the banding artifact from its neighboring area.

As the foregoing illustrates, what is needed in the art are more effective techniques for detecting banding artifacts when processing images.

SUMMARY

One embodiment sets forth a method for detecting banding in an image. The method includes generating a first set of pixel confidence values based on a first intensity difference value and first image scale associated with a first image, wherein each pixel confidence value included in the first set of pixel confidence values indicates a likelihood that a corresponding pixel included in the first image at the first image scale corresponds to banding in the first image; and generating a banding index corresponding to the first image based on the first set of pixel confidence values.

At least one technical advantage of the disclosed techniques relative to the prior art is that, with the disclosed techniques, banding in an image is detected with greater accuracy compared to prior art techniques. In particular, contrast detection is used to identify banding that is visible to human viewers but is not detectable using false edge detection techniques or false segment detection techniques. Further, unlike these conventional techniques, the results generated by the disclosed techniques are less likely to identify banding that is not visible to human viewers or visual image elements that are unrelated to banding artifacts. Accordingly, the disclosed techniques produce both fewer false positives and fewer false negatives relative to conventional techniques. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
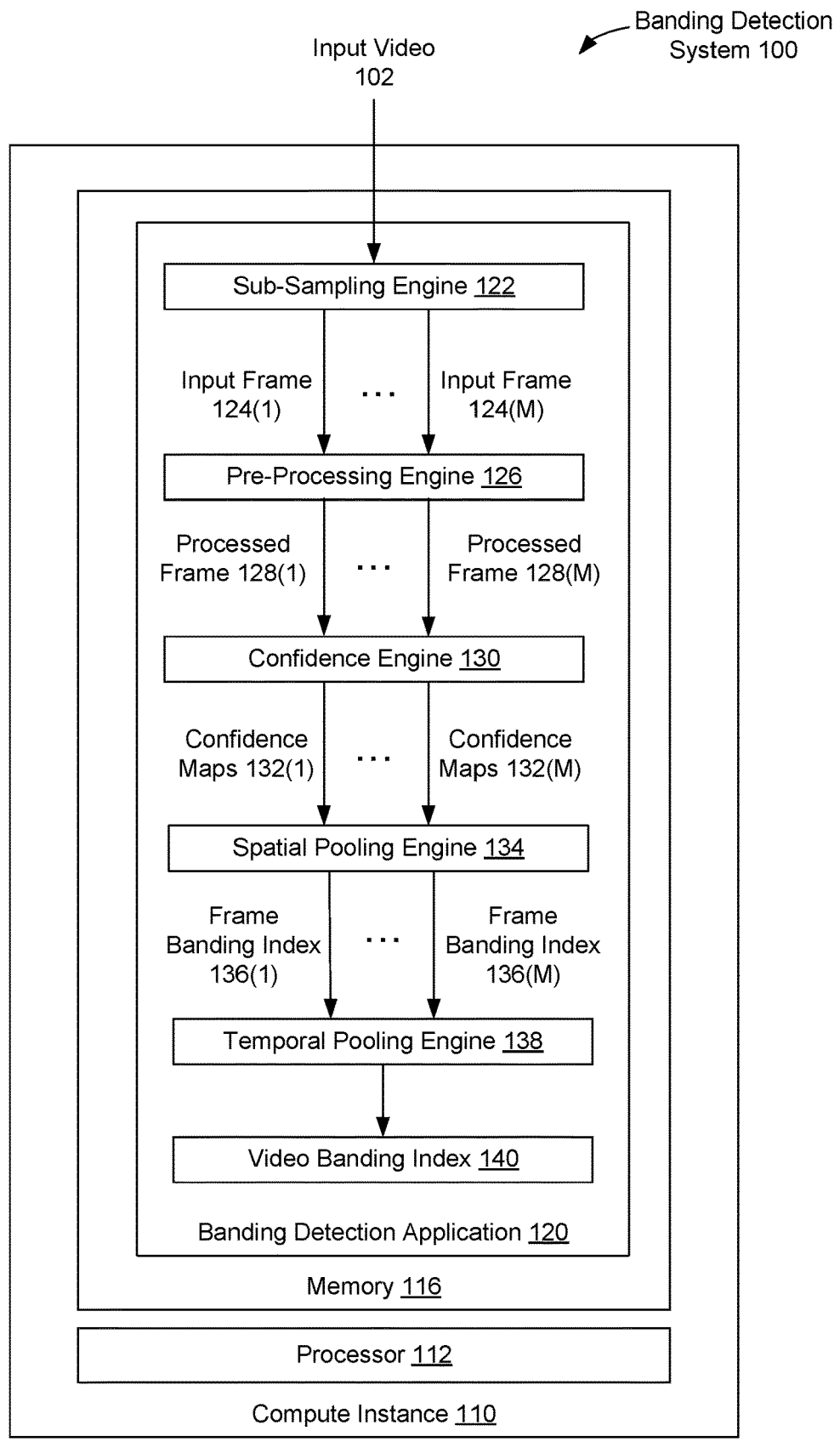
FIG. 1 is a conceptual illustration of a system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

To efficiently deliver images and/or videos to playback devices, a media service provider oftentimes processes the images and/or videos and transmits the processed images and/or videos to the playback devices. However, the visual quality of the processed images and videos are typically not as good as the visual quality of the source images and videos. One issue is that when an image having a large area with a smooth gradient is processed using techniques that quantize pixel values, such as encoding or bit-depth conversion, banding can be produced in the processed image. Banding causes the large area included in the source image to appear as having discrete "bands," as opposed to having a smooth gradient. Similarly, when a video depicts a scene that has a large area with a smooth gradient, banding can be produced in the frames of the processed video.

To improve the visual quality of the processed images and videos delivered to viewers, the media service provider may implement banding detection to identify banding within the processed images and videos. However, conventional approaches, such as false edge detection and false segment detection, cannot accurately detect banding artifacts. Specifically, these approaches often incorrectly identify edges or segments that belong to the image as banding artifacts, while also failing to correctly identify edges or segments that belong to banding artifacts.

With the disclosed techniques, a plurality of banding confidence maps are generated for an image. Each banding confidence map indicates a banding confidence for the pixels in the image based on a different intensity difference value and at different image resolution. The banding confidence for a pixel is computed based on the perceived contrast between the pixel and its neighboring pixels. For each intensity difference value, the banding confidence of the pixel indicates a number of neighboring pixels where the intensity of the neighboring pixel differs from the intensity of the pixel by an amount equal to the intensity difference value. A banding index corresponding to the image is generated based on the plurality of banding confidence maps. The banding index predicts an amount of banding visible in the image. Additionally, a banding index corresponding to a video is generated based on the banding indices for frames of the video. The banding index corresponding to the video predicts an amount of banding visible in the video.

Advantageously, using the disclosed techniques, banding in an image is detected with greater accuracy compared to prior art techniques. Notably, the disclosed techniques can more accurately identify banding that is visible to human viewers but is not detectable using conventional techniques. Further, unlike these conventional techniques, the results generated by the disclosed techniques include less banding that is not visible to human viewers or visual image elements that are unrelated to banding artifacts. Accordingly, the disclosed techniques produce both fewer false positives and fewer false negatives relative to conventional techniques.

System Overview

FIG. 1 is a conceptual illustration of a system 100 configured to implement one or more aspects of the present invention. The system 100 includes, without limitation, any number and type of compute instances 110. For explanatory purposes, multiple instances of like objects are denoted with reference numbers identifying the object and parenthetical numbers identifying the instance where needed. In various embodiments, any number of compute instances 110 may be distributed across multiple geographic locations or implemented in one or more cloud computing environments (i.e., encapsulated shared resources, software, data, etc.) in any combination.

As shown, the compute instance 110 includes, without limitation, a processor 112 and a memory 116. The processor 112 may be any instruction execution system, apparatus, or device capable of executing instructions. For example, the processor 112 could comprise a central processing unit (CPU), a graphics processing unit (GPU), a controller, a micro-controller, a state machine, or any combination thereof. The memory 116 stores content, such as software applications and data, for use by the processor 112 of the compute instance 110. In alternate embodiments, each of any number of compute instances 110 may include any number of processors 112 and any number of memories 116 in any combination. In particular, any number of compute instances 110 (including one) may provide a multiprocessing environment in any technically feasible fashion.

The memory 116 may be one or more of a readily available memory, such as random access memory (RAM), read only memory (ROM), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital card, an external Flash memory, a portable compact disc read-only memory (CD-ROM), an optical storage device, a magnetic storage device, or any suitable combination of the foregoing.

The compute instance 110 is configured to implement one or more applications or subsystems of applications. For explanatory purposes only, each application is depicted as residing in the memory 116 of the compute instance 110 and executing on a processor 112 of the compute instance 110. However, in alternate embodiments, the functionality of each application may be distributed across any number of other applications that reside in the memories 116 of any number of compute instances 110 and execute on the processors 112 of any number of compute instances 110 in any combination. Further, the functionality of any number of applications or subsystems may be consolidated into a single application or subsystem.

In particular, the compute instance 110 is configured to detect banding in an input video 102. As described previously herein, in conventional approaches to detecting banding in images, edges or segments identified in processed images are compared to edges or segments identified in source images. Edges or segments that are contained in a processed image but are not contained in a source image are identified as potential banding artifacts. One drawback of these conventional approaches is that edges or segments that belong to an image may be falsely identified as banding artifacts. Conversely, actual banding artifacts may not be successfully identified as banding artifacts.

Detecting Banding Artifacts in Images

To address the above problems, the compute instance 110 includes, without limitation, a banding detection application 120 that detects banding within an input video 102 to generate a video banding index 140. Input video 102 is a processed version of a source video (not shown). The video banding index 140 is a value that quantifies an amount of banding detected in the input video 102.

As shown, the banding detection application 120 resides in the memory 116 of the compute instance 110 and executes on the processor 112 of the compute instance 110. Although not shown in FIG. 1, any number of instances of the banding detection application 120 included in any number of compute instances 110 may be configured to generate video banding indices 140 for any number of input videos 102 concurrently, sequentially, or any combination thereof.

For explanatory purposes, the banding detection application 120 is described in the context of videos. However, as persons skilled in the art will recognize, the disclosed techniques may be applied to any number and type of portions of video content, such as feature-length movies, episodes of television shows, individual images, audiovisual clips, and so forth.

As shown in FIG. 1, the banding detection application 120 includes, without limitation, a sub-sampling engine 122, a pre-processing engine 126, a confidence engine 130, a spatial pooling engine 134, a temporal pooling engine 138, and the video banding index 140.

The sub-sampling engine 122 selects a subset of frames from a plurality of frames comprising the input video 102. The video banding index 140 for input video 102 is generated based on performing banding detection on the subset of frames selected from input video 102. As shown, the banding detection application 120 inputs the input video 102 into the sub-sampling engine 122. In response, sub-sampling engine 122 selects a plurality of input frames 124(1)-124(M) of the input video 102 for which banding detection should be performed. For explanatory purposes, M is the total number of frames selected by sub-sampling engine 122 and can be any positive integer. Sub-sampling engine 122 can select any number of frames of the input video 102 and in any technically feasible fashion. In some embodiments, sub-sampling engine 122 selects a frame every given time interval. For example, sub-sampling engine 122 may select a frame every 0.5 seconds of input video 102.

In some embodiments, banding detection application 120 generates the video banding index 140 based on all of the frames included in input video 102. Banding detection application 120 can input the plurality of frames comprising input video 102 into pre-processing engine 126 without inputting the plurality of frames into the sub-sampling engine 122, or sub-sampling engine 122 can be configured to select all frames included in the input video 102.

The pre-processing engine 126 performs one or more pre-processing operations on an input frame or image. Pre-processing engine 126 may perform any number and/or types of pre-processing operations on the input frame or image. As described in further detail below, the pre-processing operations include, without limitation, extracting the luma component, converting the bit-depth, applying a low-pass filter, and image scaling.

As shown, the banding detection application 120 inputs the input frames 124(1)-124(M) into pre-processing engine 126. Pre-processing engine 126 performs one or more pre-processing operations on input frames 124(1)-124(M) to generate processed frames 128(1)-128(M), respectively. Banding detection application 120 inputs the input frames 124(1)-124(M) into any number of instances of pre-processing engine 126 sequentially, concurrently, or in any combination thereof, and in any order. For example, banding detection application 120 may sequentially input the input frames 124(1)-124(M) into pre-processing engine 126 and, in response, pre-processing engine 126 sequentially outputs the processed frames 128(1)-128(M).

Confidence engine 130 generates a set of confidence maps based on an input frame or image. Each confidence map corresponds to a specific intensity difference value and a specific image scale. Each pixel of the confidence map indicates, for a corresponding pixel in the input frame or image, a banding confidence value associated with the corresponding pixel. The banding confidence value indicates a likelihood that the corresponding pixel is a banding artifact. In some embodiments, the banding confidence value associated with a pixel is generated based on whether, at the specific image scale, there is an intensity step of the specific intensity difference value in area surrounding the pixel. In some embodiments, confidence engine 130 generates a set of confidence maps based on four different intensity difference values and five different image scales, for a total of twenty confidence maps per input frame or image.

As shown, the pre-processing engine 126 sends the processed frames 128(1)-128(M) to the confidence engine 130. The confidence engine 130 receives the processed frames 128(1)-128(M). In response, the confidence engine 130 generates sets of confidence maps 132(1)-132(M) based on the processed frames 128(1)-128(M), respectively. Pre-processing engine 126 sends the processed frames 128(1)-128(M) to any number of instances of confidence engine 130 sequentially, concurrently, or in any combination thereof, and in any order. In some embodiments, a single instance of pre-processing engine 126 sends the processed frames 128(1)-128(M) to a single instance of confidence engine 130 in the order in which the pre-processing engine 126 generates the processed frames 128(1)-128(M).

Spatial pooling engine 134 receives a set of confidence maps corresponding to an input frame or image and generates a banding index for the corresponding frame or image based on the set of confidence maps. The banding index quantifies an amount of banding detected for the corresponding input frame or image. The spatial pooling engine 134 can generate a banding index for the input frame or image based on a set of confidence maps in any technically feasible fashion. Advantageously, generating the banding index for an input frame or image does not require a source frame or image from which the input frame or image was generated, and no computations are performed based on the source frame or image.

In some embodiments, the spatial pooling engine 134 computes, for each confidence map in the set of confidence maps, an average banding confidence value and generates the banding index based on a plurality of average banding confidence values. In some embodiments, the spatial pooling engine 134 generates, for each image scale, a banding index associated with the image scale and generates the banding index based on banding indices associated with the different image scales.

In some embodiments, the spatial pooling engine 134 selects, for each confidence map included in a set of confidence maps 132, a plurality of pixels with the highest banding confidence values and computes the frame banding index 136 based on the selected plurality of pixels. The number of pixels included in the plurality can be any integer between 1 and the number of pixels in the confidence map (i.e., all of the pixels in the confidence map). As an example, spatial pooling engine 134 can select 30% of the pixels included in the confidence map that have the highest banding confidence values. Spatial pooling engine 134 can select a different plurality of pixels for each confidence map included in the set of confidence maps 132.

As shown, confidence engine 130 sends the sets of confidence maps 132(1)-132(M) to spatial pooling engine 134. Spatial pooling engine 134 receives the sets of confidence maps 132(1)-132(M) from confidence engine 130. In response, spatial pooling engine 134 generates frame banding indices 136(1)-136(M) corresponding to the input frames 124(1)-124(M), respectively. Confidence engine 130 sends the sets of confidence maps 132(1)-132(M) to any number of instances of spatial pooling engine 134 sequentially, concurrently, or in any combination thereof, and in any order. In some embodiments, a single instance of confidence engine 130 sends the sets of confidence maps 132(1)-132(M) to a single instance of spatial pooling engine 134 in the order in which the confidence engine 130 generates the confidence maps 132(1)-132(M).

Temporal pooling engine 138 receives a plurality of frame banding indices corresponding to a plurality of frames of an input video and generates, based on the plurality of frame banding indices, a video banding index corresponding to the input video. As shown, the banding detection application 120 inputs the frame banding indices 136(1)-136(M) into the temporal pooling engine 138. In response, temporal pooling engine 138 generates the video banding index 140. The temporal pooling engine 138 can compute the video banding index 140 based on the frame banding indices 136(1)-136(M) in any technically feasible fashion. For instance, in some embodiments, the temporal pooling engine 138 sets the video banding index 140 equal to the sum of the frame banding indices 136(1)-136(M) divided by the number of input frames M. Accordingly, the video banding index 140 represents the average banding index across the input frames 124(1)-124(M) sampled from input video 102.

In some embodiments, banding detection application 120 outputs the video banding index 140. In some embodiments, banding detection application 120 outputs the frame banding indices 136(1)-136(M) instead of, or in addition to, the video banding index 140. The frame banding indices 136(1)-136(M) indicate the amounts of banding detected at different points in the input video 102. The frame banding indices 136(1)-136(M) may be used, for example, to identify portions of the input video 102 that have more banding compared to other portions of the input video 102. Outputting the video banding index 140 and/or the frame banding indices 136(1)-136(M) can include transmitting the video banding index 140 and/or frame banding indices 136(1)-136(M) to any number of software applications. Advantageously, by quantifying the amount of banding present in an input video (video banding index 140) or input image (frame banding index 136), the video banding index 140 and frame banding indices 136(1)-136(M) enable developers and software applications to identify videos and/or images with banding artifacts and reliably optimize encoding operations to reduce banding.

It will be appreciated that the system 100 shown herein is illustrative and that variations and modifications are possible. The connection topology, including the location and arrangement of the sub-sampling engine 122, pre-processing engine 126, confidence engine 130, spatial pooling engine 134, and temporal engine 138 may be modified as desired. One or more of the components may be combined into a single component or divided into multiple components. In certain embodiments, one or more components shown in FIG. 1 may not be present.

Note that the techniques described herein are illustrative rather than restrictive, and may be altered without departing from the broader spirit and scope of the embodiments. Many modifications and variations will be apparent to those of ordinary skill in the art without departing from the scope and spirit of the described embodiments and techniques. Further, in various embodiments, any number of the techniques disclosed herein may be implemented while other techniques may be omitted in any technically feasible fashion.

Figure 2:
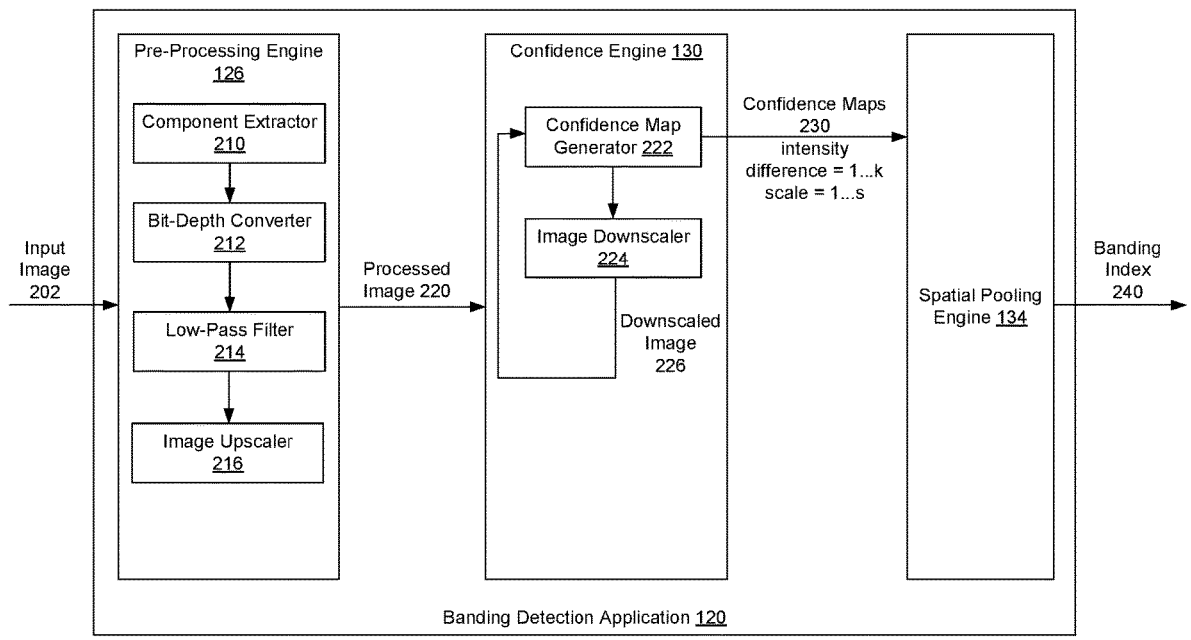
FIG. 2 is a more detailed illustration of the banding detection application of FIG. 1, according to various embodiments.

FIG. 2 is a more detailed illustration of the banding detection application 120 of FIG. 1, according to various embodiments of the present invention. As shown in FIG. 2, banding detection application 120 receives an input image 202 and generates a banding index 240 corresponding to the input image 202. The banding index 240 quantifies an amount of banding detected in the input image 202. Input image 202 can be any type of image, such as an encoded image. Referring to FIG. 1, the input image 202 can be a frame from an input video 102, such as one of input frames 124(1)-124(M).

Pre-processing engine 126 receives the input image 202 and performs one or more pre-processing operations on the input image 202 to generate a processed image 220. As shown in FIG. 2, pre-processing engine 126 includes, without limitation, a component extractor 210, a bit-depth converter 212, a low-pass filter 214, and an image upscaler 216. Each of the component extractor 210, bit-depth converter 212, low-pass filter 214, and image upscaler 216 correspond to a different pre-processing operation performed on the input image 202.

Input image 202 comprises a plurality of image component channels, such as a luma component, a red-difference color component, and a blue-difference color component for YCrCb images; a red color component, a green color component, and a blue color component for RGB images; and so forth. Component extractor 210 extracts one or more image component channels from the input image 202. In some embodiments, the plurality of image component channels includes a luma component, and component extractor 210 extracts the luma component from the input image 202. In some embodiments, the plurality of image component channels does not include a luma component, for example, when the input image 202 only includes color channels. Component extractor 210 computes the luma component based on the plurality of image component channels. For each pixel in the input image 202, the luma component represents the brightness, or intensity, of the pixel.

Bit-depth converter 212 converts the input image 202 from the bit-depth of the input image 202 to a target bit-depth. The bit-depth refers to the number values that can be used to represent the value of a pixel. For example, 2 bits are used to represent a pixel value when the bit-depth is 2, 4 bits are used to represent the pixel value when the bit-depth is 4, and so forth. Bit-depth converter 212 can convert the bit-depth of the input image 202 to any technically feasible target bit-depth. In some embodiments, bit-depth converter 212 converts the input image 202 to a bit-depth of 10 (i.e., to a 10-bit image), if the input image 202 does not have a bit-depth of 10. For example, if the input image 202 is an 8-bit image, bit-depth converter 212 converts the input image 202 into a 10-bit image by multiplying the value of each pixel by 4. In some embodiments, bit-depth converter 212 receives the extracted luma component from component extractor 210 and converts the bit-depth of the extracted luma component.

In some instances, the input image 202 includes dithering. Dithering is noise that is intentionally applied to the input image 202. Dithering affects the appearance of banding in the input image 202, such as breaking up an otherwise clean contour around a band. In conventional approaches that identify edges or contours in the input image 202, dithering causes edges or contours to be detected incorrectly. To reduce the effects of dithering on the input image 202, low-pass filter 214 applies one or more low-pass filters to the input image 202. As shown, the low-pass filter receives the converted bit-depth image from bit-depth converter 212 and applies the one or more low-pass filters to the converted bit-depth image. In some embodiments, the low-pass filter 214 receives the extracted luma component from component extractor 210 and applies the one or more low-pass filters to the extracted luma component. Low-pass filter 214 can apply any number and/or types of low-pass filters. The type of low-pass filter applied may vary depending on the type of dithering applied to the input image 202. In some embodiments, the low-pass filter 214 applies a 2×2 mean filter. Advantageously, by applying a low-pass filter, low-pass filter 214 smooths the intensity values in the input image 202 which improves banding detectability.

Image upscaler 216 upscales the input image 202 from the image scale of the input image 202 to a target image scale, if the image scale of the input image 202 is smaller than the target image scale. The image scale refers to the resolution of the image. Image upscaler 216 can upscale the image to any target image scale and in any technically feasible fashion. In some embodiments, image upscaler 216 upscales the input image 202 to a 4k UHD (3840 pixel by 2160 pixel) resolution, also referred to herein as a 2160p image scale, if the input image 202 is smaller than the 2160p image scale. The target image scale may be the resolution of a target display device for displaying input image 202. As shown, image upscaler 216 receives the input image 202, with one or more low-pass filters applied, from low-pass filter 214. In some embodiments, image upscaler 216 receives the extracted luma component from component extractor 210 and upscales the extracted luma component. In some embodiments, image upscaler 216 receives the converted bit-depth image from bit-depth converter 212 and upscales the converted bit-depth image.

Confidence engine 130 receives the processed image 220 and generates a plurality of confidence maps 240 based on the processed image 220. As shown in FIG. 2, confidence engine 130 includes, without limitation, a confidence map generator 222 and an image downscaler 224.

Confidence map generator 222 receives an image and generates one or more confidence maps based on the image. As discussed above, each confidence map corresponds to a different image scale and intensity difference value. Each pixel of a confidence map 230 indicates, for a corresponding pixel in the processed image 220, a banding confidence value associated with the corresponding pixel. The banding confidence value associated with a pixel indicates whether, at the specific image scale, there is an intensity step of the specific intensity difference value in area surrounding the pixel. As shown in FIG. 2, confidence map generator 222 generates, for each image scale 1 through S, a set of K confidence maps 230 corresponding to intensity difference values 1 through K, respectively. Accordingly, confidence map generator 222 generates S*K number of confidence maps.

Confidence map generator 222 receives the processed image 220 from pre-processing engine 126. The processed image 220 is at a first image scale. Confidence map generator 222 generates K confidence maps based on the processed image 220. In some embodiments, confidence map generator 222 generates, for the image scale, four confidence maps corresponding to intensity difference values of 1, 2, 3, and 4, respectively.

Confidence map generator 222 computes, for each pixel in the image 220, the banding confidence value of the pixel based on a specific intensity difference value k and a specific image scale s of the processed image 220. An example function for computing the banding confidence value c(k, s) of a pixel (x, y) is given by equations (1a) and (1b):

$$c(k, s) = p(0, s) \times \max\left[\frac{p(-k, s)}{p(0, s) + p(-k, s)}, \frac{p(k, s)}{p(0, s) + p(k, s)}\right] \quad (1a)$$

$$p(k, s) = \frac{\Sigma\{(x', y') \in N_s(x, y) \mid \|\nabla(x', y')\| < \tau_g\}^{\delta(I(x', y'), I(x, y) + k)}}{\Sigma\{(x', y') \in N_s(x, y) \mid \|\nabla(x', y')\| < \tau_g\}^1} \quad (1b)$$

In equations (1a) and (1b), I(x, y), $N_s$(x, y), and $\nabla$(x, y) correspond to the intensity at the pixel, the neighborhood of the pixel at a scale s, and the gradient magnitude at the pixel, respectively; $\delta$ is an indicator function; and $\tau_g$ is a hyper-parameter chosen to avoid textures during banding detection. Accordingly, in equations (1a) and (1b), p(k, s) corresponds to the fraction of pixels, in a neighborhood around the pixel (x, y), with an intensity difference value of k among the set of pixels with a gradient magnitude smaller than $\tau_g$.

In some embodiments, the neighborhood around the pixel is a window of size 63 pixels by 63 pixels, centered around the pixel (i.e., 31 pixels in each direction). For a 2160p image, this window size corresponds to a 1° visual angle at a standard viewing distance for 2160p content (i.e., 1.6 times the height of a display device) for banding detection. The amount of banding detected in an image may vary depending on the spatial frequency of the bands. To account for this variation, the processed image 220 is downsampled such so that the window size corresponds to a different visual angle and thus, a different spatial frequency.

Image downscaler 224 performs one or more downscaling operations on the processed image 220 to generate a downscaled image 226 at a second image scale. Image downscaler 224 may perform any number and/or types of downscaling operations on the processed image 220. In some embodiments, image downscaler 224 decimates the processed image 220 by a factor of 2. Image downscaler 224 selects every other pixel in processed image 220 to keep, and discards the other pixel. Downscaled image 226 comprises the selected pixels.

Confidence map generator 222 receives the downscaled image 226 and generates another set of K confidence maps based on the downscaled image 226. The downscaling and confidence map generation described above is repeated for s image scales. In some embodiments, image downscaler 224 generates four downscaled images 226, corresponding to image scales 1080p, 540p, 270p, and 135p, respectively. Accordingly, confidence map generator 222 generates a total of twenty confidence maps 230, corresponding to intensity difference values 1, 2, 3, and 4, and image scales 2160p, 1080p, 540p, 270p, and 135p. The image scales 2160p, 1080p, 540p, 270p, and 135p correspond to visual degrees 1°, 2°, 4°, 8°, and 16°, respectively.

Spatial pooling engine 134 receives the plurality of confidence maps 230 and generates a banding index 240 based on the plurality of confidence maps 230. An example function for computing a banding index based on a plurality of confidence maps is given by equation (2):

$$\text{banding\_index} = \frac{\Sigma_{(x,y) \in k_p} \Sigma_{k=1,\ldots,4} \Sigma_{v°=1,2,\ldots,16} c(k,s) \times k \times \log_2\left(\frac{16}{v°}\right)}{\Sigma_{(x,y) \in k_p} 1} \quad (2)$$

In equation (2), k represents the different intensity difference values (1, 2, 3, and 4), v° represents different visual degrees (1, 2, 4, 8, and 16), and 1/v° represents the different spatial frequencies at which banding is detected. Additionally, in equation (2), $k_p$ represents the set of p pixels, in the confidence map corresponding to intensity difference value k, with the highest banding confidence values. The size of the set of pixels $k_p$ may be any size between 1 and the number of pixels in the confidence map. In some embodiments, $k_p$ includes all of the pixels in each confidence map. In some embodiments, $k_p$ includes 30 percent of the pixels in each confidence map. In some embodiments, $k_p$ includes 60 percent of the pixels in each confidence map.

Figure 3:
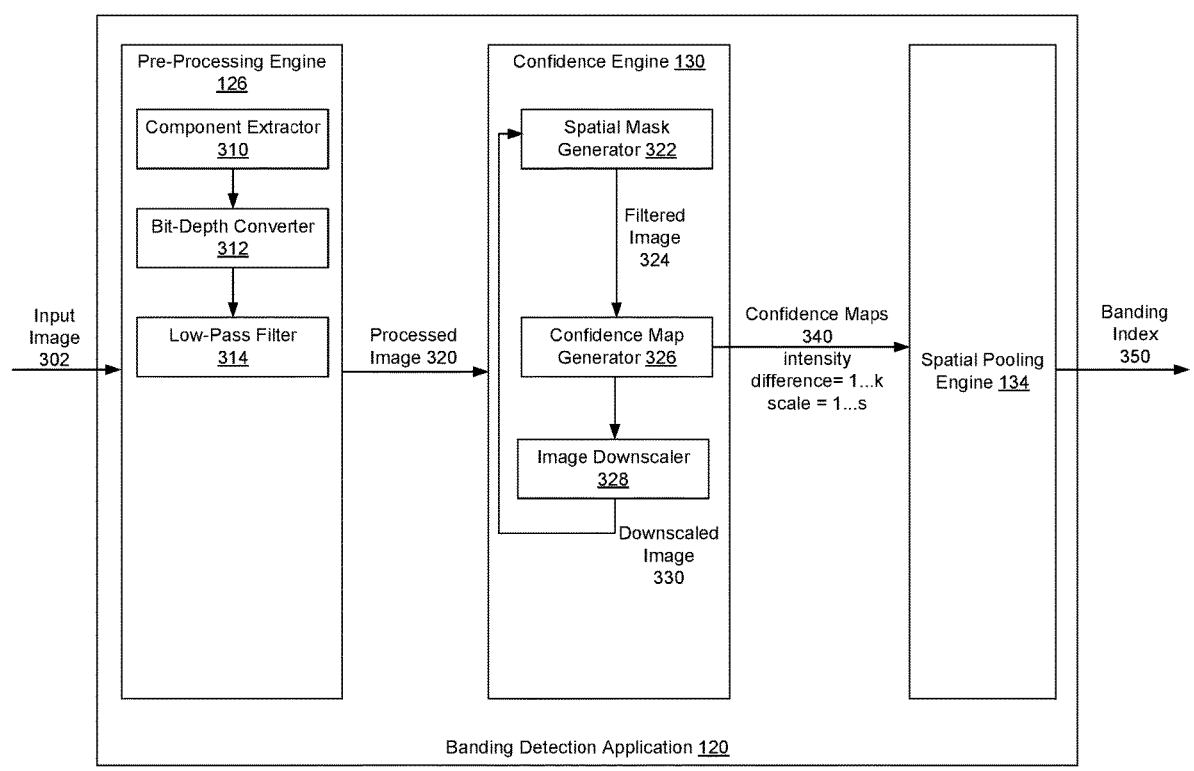
FIG. 3 is a more detailed illustration of the banding detection application of FIG. 1, according to various other embodiments.

FIG. 3 is a more detailed illustration of the banding detection application 120 of FIG. 1, according to yet other embodiments of the present invention. As shown in FIG. 3, banding detection application 120 receives an input image 302 and generates a banding index 350. The banding index 350 quantifies an amount of banding detected in the input image 302. Input image 302 can be any type of image, such as an encoded image. Referring to FIG. 1, the input image 302 can be a frame from an input video 102, such as one of input frames 124(1)-124(M).

Pre-processing engine 126 receives the input image 302 and performs one or more pre-processing operations on the input image 302 to generate a processed image 320. As shown in FIG. 2, pre-processing engine 126 includes, without limitation, a component extractor 310, a bit-depth converter 312, and a low-pass filter 314. Each of the component extractor 310, bit-depth converter 312, and low-pass filter 314 correspond to a different pre-processing operation performed on the input image 302.

Input image 302 comprises a plurality of image component channels, such as a luma component, a red-difference color component, and a blue-difference color component for YCrCb images; a red color component, a green color component, and a blue color component for RGB images; and so forth. Component extractor 310 extracts one or more image component channels from the input image 302. In some embodiments, the plurality of image component channels includes a luma component, and component extractor 310 extracts the luma component from the input image 302. In some embodiments, the plurality of image component channels does not include a luma component, for example, when the input image 202 only includes color channels. Component extractor 210 computes the luma component based on the plurality of image component channels. For each pixel in the input image 302, the luma component represents the brightness, or intensity, of the pixel.

Bit-depth converter 312 converts the input image 302 from the bit-depth of the input image 302 to a target bit-depth. Bit-depth converter 312 can convert the bit-depth of the input image 202 to any technically feasible target bit-depth. In some embodiments, bit-depth converter 312 converts the input image 302 to a bit-depth of 10 (i.e., to a 10-bit image), if the input image 302 does not have a bit-depth of 10. For example, if the input image 302 is an 8-bit image, bit-depth converter 312 converts the input image 302 into a 10-bit image by multiplying the value of each pixel by 4. In some embodiments, bit-depth converter 312 receives the extracted luma component from component extractor 310 and converts the bit-depth of the extracted luma component.

In some instances, the input image 302 includes dithering. Dithering is noise that is intentionally applied to the input image 302. Dithering affects the appearance of banding in the input image 302, such as breaking up an otherwise clean contour around a band. To reduce the effects of dithering on the input image 302, low-pass filter 314 applies one or more low-pass filters to the input image 302. As shown, the low-pass filter receives the converted bit-depth image from bit-depth converter 312 and applies the one or more low-pass filters to the converted bit-depth image. In some embodiments, the low-pass filter 314 receives the extracted luma component from component extractor 310 and applies the one or more low-pass filters to the extracted luma component. Low-pass filter 314 can apply any number and/or types of low-pass filters. The type of low-pass filter applied may vary depending on the type of dithering applied to the input image 202. In some embodiments, the low-pass filter 214 applies a 2×2 mean filter.

Confidence engine 130 receives the processed image 320 and generates a plurality of confidence maps 240 based on the processed image 320. As shown in FIG. 2, confidence engine 130 includes, without limitation, a spatial mask generator 322, a confidence map generator 326, and an image downscaler 328.

Spatial mask generator 322 receives an image and generates a spatial mask based on the image. When applied to the image, the spatial mask filters out one or more portions of the image. As shown in FIG. 2, spatial mask generator 322 receives the processed image 320 and generates a spatial mask based on the processed image 320. Spatial mask generator 322 applies the spatial mask to the processed image 320 to generate a filtered image 324.

In some embodiments, to generate the spatial mask, spatial mask generator 322 determines for each pixel of the processed image 320, the first derivatives in a horizontal direction, $d_x$, and a vertical direction, $d_y$, using 2×1 and 1×2 kernels. Spatial mask generator 322 computes, a magnitude of the first derivatives. An example function for computing the magnitude of the derivatives, $d_{mag}$, is given by equation (3):

$$d_{mag} = \sqrt{d_x^2 + d_y^2} \quad (3)$$

In some embodiments, spatial mask generator 322 computes a median value of the magnitude of the derivatives $d_{mag}$ corresponding to a plurality of pixels within a window around each pixel. In some embodiments, the window is a 7×7 window. Spatial mask generator 322 determines whether the median value is greater than a threshold value. If the median value is greater than the threshold value, then spatial mask generator 322 sets the value of the corresponding pixel in the image mask to 1. If the median value is less than or equal to the threshold value, then spatial mask generator 322 sets the value of the corresponding pixel in the image mask to 0. In some embodiments, the threshold value is equal to the square root of a ratio between the size of a 2160p image and the size of the processed image 320. In other embodiments, ratios between other aspects of the processed image 320 and a 2160p image can be used, such as the height or the width of the processed image 320, and/or with other size images, such as 1080p.

In some embodiments, spatial mask generator 322 determines the number of pixels within the window size where the magnitude of the derivatives $d_{mag}$ is equal to 0. Spatial mask generator 322 determines whether the number of pixels is greater than a threshold value. If the number of pixels is greater than the threshold value, then spatial mask generator 322 sets the value of the corresponding pixel in the image mask to 1. If the number of pixels is less than or equal to the threshold value, then spatial mask generator 322 sets the value of the corresponding pixel in the image mask to 0. The threshold value for comparing the number of pixels can be different from the threshold value for comparing the median value of the magnitude of the derivatives discussed above. In some embodiments, the threshold value for comparing the number of pixels is based on the window size and a ratio between the size of the processed image 320 and the size of a 2160p image (3840 pixels by 2160 pixels). An example function for determining a threshold value, $t_{idx}$, is given by equation (4):

$$t_{idx} = \text{floor}\left(\left\lfloor\frac{w_{size}^2}{2}\right\rfloor - 3 \times (r_{ratio} - 1)\right) \quad (4)$$

In equation (4), $w_{size}$ represents the window size (eq., 7×7 pixels) and $r_{ratio}$ represents the square root of the ratio between the size of a 2160p image and the size of the processed image 320. In other embodiments, ratios between other aspects of the processed image 320 and a 2160p image can be used, such as the height or the width of the processed image 320, and/or with other size images, such as 1080p. As shown in equation (4), the threshold value $t_{idx}$ decreases when $r_{ratio}$ increases, and has a maximum value when the ratio is 1. In other embodiments, other functions that capture the same relationship between the threshold value $t_{idx}$ and $r_{ratio}$ can be used (with different parameters).

One benefit of applying the spatial mask to the processed image 320 is that banding detection is not performed for areas of the image with a large amount of textures. Regions of the image with high amounts of texture and/or noise include pixels whose values can differ by amounts equal to the intensity difference values used by the confidence map generator 326 to compute banding confidence values. Applying the spatial mask avoids generating high banding confidence values for these regions. Compared to edge detection operations, the techniques disclosed above generate more accurate results by avoiding the textured and/or non-flat areas depicted in the input image.

In some embodiments, spatial mask generator 322 performs 3×3 mode-based filtering on the processed image 320 to generate a mode filtered image. Spatial mask generator 322 applies the image mask to the mode filtered image to generate the filtered image 324. In some embodiments, applying the image mask to the mode filtered image includes performing pixel-wise multiplication between pixels of the image mask and pixels of the mode filtered image. Using the 3×3 mode filter reduces additional values between contours that are introduced by the low-pass filter 314.

Confidence map generator 326 receives an image and generates one or more confidence maps based on the image. As discussed above, each confidence map corresponds to a different image scale and intensity difference value. Each pixel of a confidence map 340 indicates, for a corresponding pixel in the processed image 320, a banding confidence value associated with the corresponding pixel. The banding confidence value associated with a pixel indicates whether, at the specific image scale, there is an intensity step of the specific intensity difference value in area surrounding the pixel. As shown in FIG. 3, confidence map generator 326 generates, for each image scale 1 through S, a set of K confidence maps 340 corresponding to intensity difference values 1 through K, respectively. Accordingly, confidence map generator 326 generates S*K number of confidence maps.

As shown in FIG. 3, confidence map generator 326 receives the filtered image 324 from spatial mask generator 322. The processed image 320, and thus the filtered image 324, is at a first image scale. Confidence map generator 326 generates K confidence maps based on the filtered image 324. In some embodiments, confidence map generator 326 generates, for the image scale, four confidence maps corresponding to intensity difference values of 1, 2, 3, and 4, respectively. Confidence map generator 326 computes, for each pixel in the filtered image 324, the banding confidence value of the pixel for each specific intensity difference value k and the specific image scale s of the filtered image 324. An example function for computing the banding confidence value c(k, s) of a pixel (x, y) is given by equations (1a) and (1b), discussed above in connection with FIG. 2.

As illustrated in FIG. 3, pre-processing engine 126 does not upscale the input image 302. In some embodiments, the size of the window for determining the neighborhood around the pixel is scaled based on the size of the input image 302. An example formula for determining the window size is given by equation (5):

$$\text{window\_size} = \text{floor}\left(63 \times \frac{\text{width}}{3840}\right) \quad (5)$$

Figure 5:
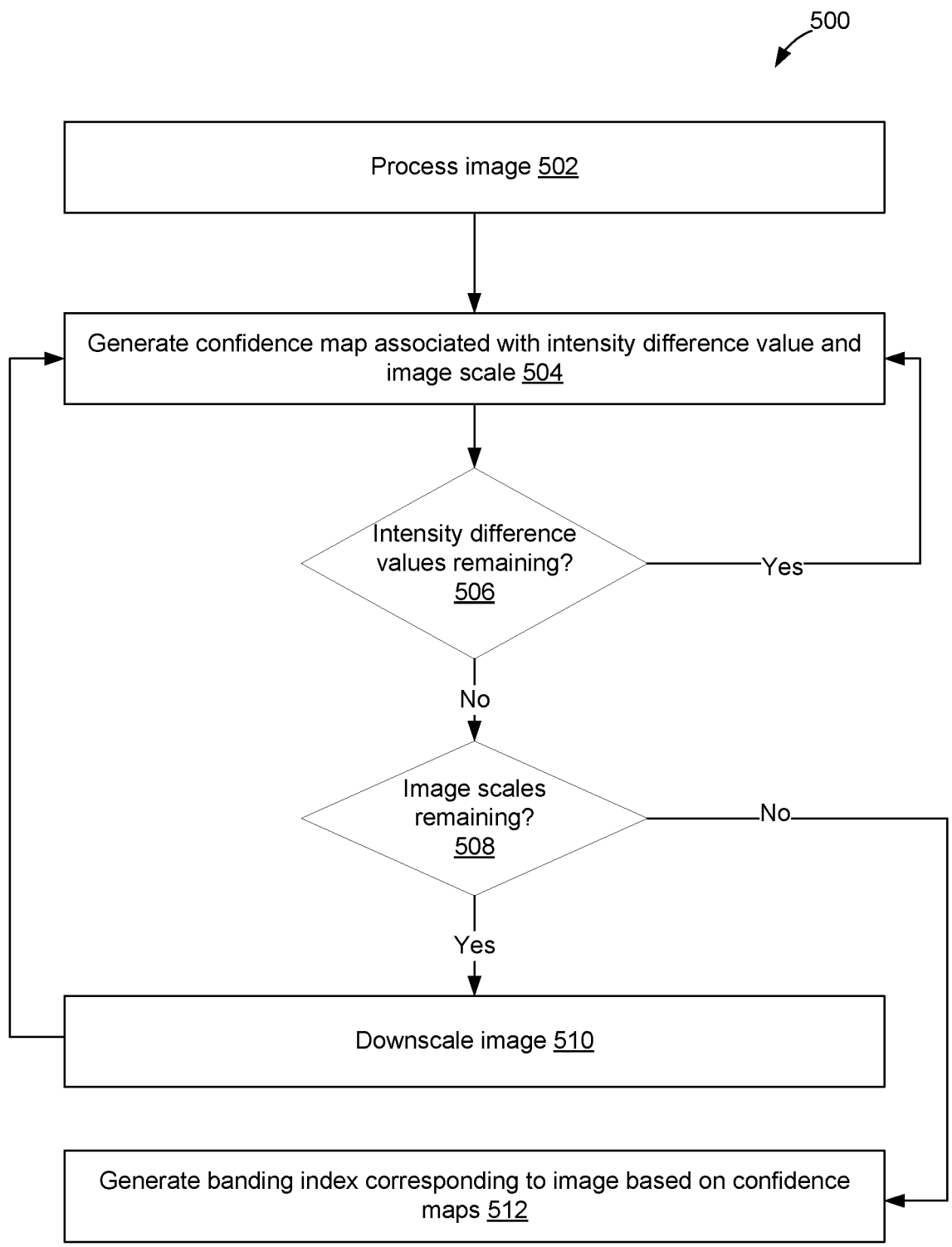
FIG. 5 is a flowchart of method steps for generating a banding index for an input image, according to various other embodiments.

As shown in FIG. 5, the window size is based on a ratio between the width of the input image 302 and a 2160p image. In other embodiments, ratios between other aspects of the input image 302 and a 2160p image can be used, such as the height or the size of the input image 302, and/or with other size images, such as 1080p.

In some embodiments, confidence map generator 326 applies luminance masking when generating the confidence maps 340. The confidence map generator 326 determines, for the processed image 320, a luma threshold at which banding is not visible. Pixels that are brighter than the luma threshold do not contribute to perceived banding. That is, banding artifacts whose pixels are brighter than the luma threshold are not visible to a human viewer. Advantageously, applying luminance masking reduces false positives where luminance levels are high and banding artifacts are not visible.

Confidence map generator 326 determines, for each pixel, a luminance of the pixel based on the luma value of the pixel. In some embodiments, determining the luminance of the pixel is based on a transfer function, BT.1886, that characterizes luminance level on a display given a pixel value. Confidence map generator 326 determines the luminance of the pixel using BT.1886 with the parameter corresponding to black screen luminance set at a value of 0.01 nits and the parameter corresponding to white screen luminance set at a value of 300 nits. In other embodiments, other transfer functions and/or parameters may be used to model different viewing conditions. For instance, for HDR-capable displays, the PQ (Perceptual Quantizer) or HLG (Hybrid Log Gamma) functions could be used to compute luminance.

Confidence map generator 326 determines, for each pixel, a contrast of the pixel based on the luminance of the pixel and the luminance of the pixel at each intensity difference value. An example function for determining the contrast of a pixel with luma value Y and intensity difference value k is given by equation (6):

$$\text{contrast} = \frac{\text{luminance}(Y+k) - \text{luminance}(Y)}{\text{luminance}(Y)} \quad (6)$$

Confidence map generator 326 determines whether the contrast for the pixel at each intensity difference value is less than a threshold value. If the contrast for the pixel at an intensity difference value k is less than the threshold value, then confidence map generator 326 sets the value of p(k, s), as described above in equations (1a) and (1b), to 0. In some embodiments, the threshold value is a hyperparameter set to 0.019.

Confidence map generator 326 can use other functions for performing luminance masking. For example, the threshold value can be a dynamically computed value, rather than a constant value. As another example, instead of computing the luminance value for each pixel, the mean luminance value for a region around each pixel can be computed, and the visibility threshold for banding in the pixel can be based on the mean luminance value.

Image downscaler 328 performs one or more downscaling operations on the filtered image 324 to generate a downscaled image 330 at a second image scale. Image downscaler 328 may perform any number and/or types of downscaling operations on the filtered image 324. In some embodiments, image downscaler 328 decimates the filtered image 324 by a factor of 2. Image downscaler 328 selects every other pixel in filtered image 324 to keep, and discards the other pixel. Downscaled image 330 comprises the selected pixels.

Spatial mask generator 322 receives the downscaled image 330 and generates an image mask based on the downscaled image 330. Spatial mask generator 322 generates the image mask based on the downscaled image 330 in a manner similar to that discussed above with reference to generating an image mask based on the processed image 320. Spatial mask generator 322 applies the spatial mask to the downscaled image 330 to generate a filtered image 324 corresponding to the downscaled image 330. Confidence map generator 326 receives the filtered image 324 corresponding to the downscaled image 330 and generates another set of k confidence maps based on the downscaled image 330. The downscaling, spatial mask generation, confidence map generation, and luminance mask generation described above is repeated for s image scales. In some embodiments, image downscaler 328 generates four downscaled images 330, corresponding to image scales 1080p, 540p, 270p, and 135p, respectively. Accordingly, confidence map generator 326 generates a total of twenty confidence maps 340, corresponding to intensity difference values 1, 2, 3, and 4, and image scales 2160p, 1080p, 540p, 270p, and 135p.

In some embodiments, input image 302 is a smaller image scale than 2160p, and image downscaler 328 generates downscaled images 330 until the image scale is 135p. For example, if input image 302 is at image scale 1080p, then image downscaler 328 generates three downscaled image 330, corresponding to image scales 540p, 270p, and 135p. Accordingly, confidence map generator 326 only generates sixteen confidence maps 340, corresponding to intensity difference values 1, 2, 3, and 4, and image scales 1080p, 540p, 270p, and 135p. Advantageously, starting with the image scale of the input image, rather than upscaling input image to a higher resolution, reduces the amount of processing required to generate a banding index for input images that are lower resolutions.

Spatial pooling engine 134 receives the plurality of confidence maps 340 and generates a banding index 350 based on the plurality of confidence maps 340. As discussed above, in some embodiments, spatial pooling engine 134 computes the banding index based on averaging the banding confidence values of pixels, within each confidence map in the plurality of confidence maps 340, with the highest banding confidence values. An example function for computing a banding index based on a plurality of confidence maps is given by equation (2), discussed above in connection with FIG. 2.

In some embodiments, the spatial pooling engine 134 computes a banding index corresponding to each image scale based on the confidence maps corresponding to the image scale. The spatial pooling engine 134 computes a banding index corresponding to the input image 302 based on the banding indices for the different image scales. An example function for computing a banding index based on banding indices for different image scales is given by equations (7a) and (7b) below:

$$\text{banding\_index}_{scale} = \sum_{(x,y) \in k_p(s)} \max_{k=1,\ldots,4} [c(k, s) \times k] \quad (7a)$$

$$\text{banding\_index}_{image} = \sum_{\substack{v^\circ = 2^s \\ s \in 0,\ldots,4}} \text{banding\_index}_{scale} \times \log_2\left(\frac{16}{v^\circ}\right) \quad (7b)$$

In equations (7a) and (7b), k represents the different intensity difference values (1, 2, 3, and 4), $v°$ represents different visual degrees (1, 2, 4, 8, and 16), and $1/v°$ represents the different spatial frequencies at which banding is detected. Additionally, in equations (7a) and (7b), $k_p$ represents the set of p pixels, in the confidence map corresponding to intensity difference value k, with the highest banding confidence values. The size of the set of pixels $k_p$ may be any size between 1 and the number of pixels in the confidence map. In some embodiments, $k_p$ includes all of the pixels in each confidence map. In some embodiments, $k_p$ includes 30 percent of the pixels in each confidence map. In some embodiments, $k_p$ includes 60 percent of the pixels in each confidence map.

In the examples illustrated by equations (2), (7a), and (7b), the banding confidence values of pixels of a confidence map are weighted based on the intensity difference value and image scale corresponding to the confidence map. In equations (2), (7a), and (7b), intensity difference values 1, 2, 3, and 4 are assigned weights 1, 2, 3, and 4, respectively, and image scales 1, ½, ¼, ⅛, and 1/16 are assigned weights 16, 8, 4, 2, and 1, respectively. In other embodiments, other weighting functions and weights can be used. For example, confidence map generator 222 and/or confidence map generator 326 can apply a threshold on minimum and maximum banding confidence values. As another example, confidence map generator 222 and/or confidence map generator 326 can weigh the banding confidence values in a non-linear fashion.

Figure 4:
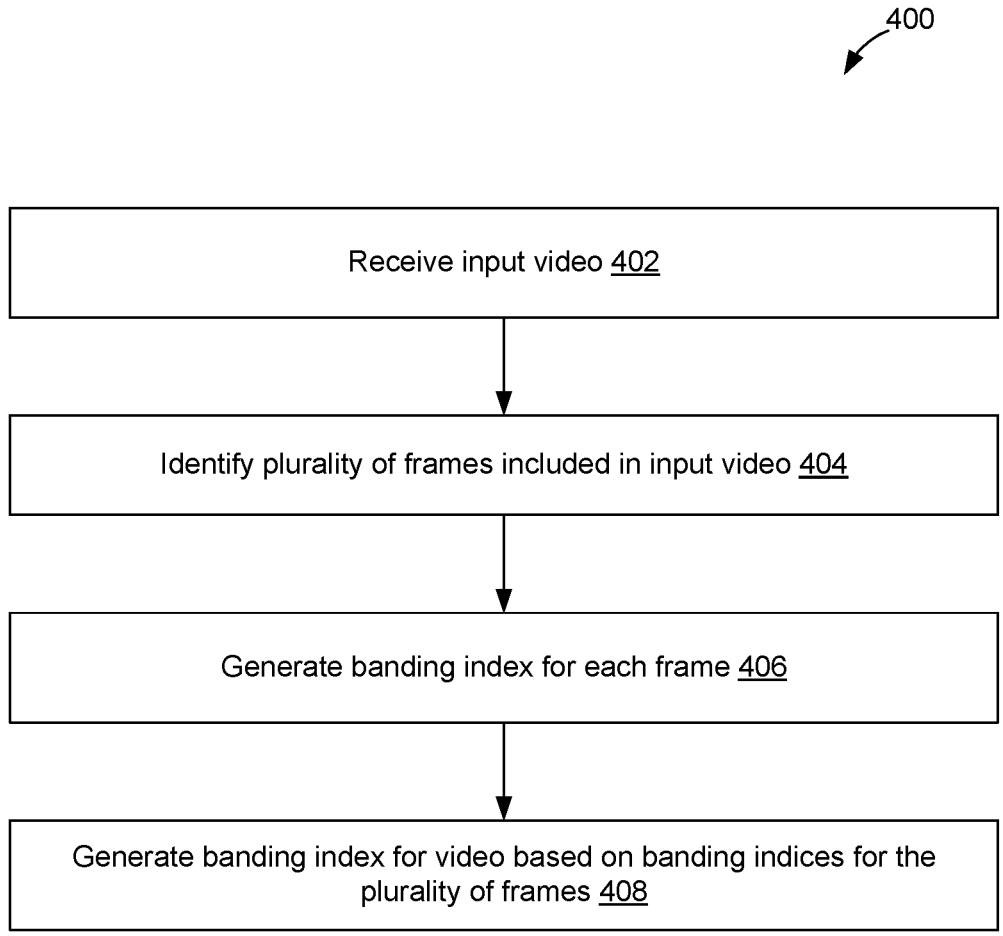
FIG. 4 is a flowchart of method steps for generating a banding index for an input video, according to various embodiments.

FIG. 4 is a flowchart of method steps for generating a banding index for an input video, according to various embodiments of the present invention. Although the method steps are described with reference to the systems of FIGS. 1-3, persons skilled in the art will understand that any system configured to implement the method steps, in any order, falls within the scope of the present invention.

As shown, a method 400 begins at step 402, where the banding detection application 120 receives an input video 102. At step 404, banding detection application 120 identifies a plurality of frames 124(1)-124(M) included in the input video 102 for performing banding detection. Identifying the plurality of frames 124(1)-124(M) is performed in a manner similar to that discussed above with respect to sub-sampling engine 122. In some embodiments, banding detection application 120 selects one frame at different time intervals of input video 102 (e.g., every 0.5 seconds).

At step 406, banding detection application 120 generates, for each frame included in the plurality of frames 124(1)-124(M), a frame banding index 136 associated with the frame. Generating a frame banding index 136 associated with each frame is performed in a manner similar to that discussed above with respect to confidence engine 130 and spatial pooling engine 134 and as further described below with respect to FIG. 5. In some embodiments, generating the frame banding index 136 associated with a frame includes performing one or more pre-processing operations on the frame to generate a processed frame, generating a plurality of confidence maps based on the processed frame, and generating the banding index based on the plurality of confidence maps.

At step 408, banding detection application 120 generates a video banding index 140 for the input video 102 based on the plurality of frame banding indices 136(1)-136(M) associated with the plurality of frames 124(1)-124(M). Generating the video banding index 140 is performed in a manner similar to that discussed above with respect to temporal pooling engine 138. In some embodiments, generating the video banding index 140 includes calculating an average of the plurality of frame banding indices 136(1)-136(M). Banding detection application 120 stores the video banding index 140 and/or plurality of frame banding indices 136(1)-136(M) in memory and/or transmits the video banding index 140 and/or plurality of frame banding indices 136(1)-136(M) to any number of software applications for future use.

FIG. 5 is a flowchart of method steps for generating a banding index for an input image, according to various embodiments of the present invention. Although the method steps are described with reference to the systems of FIGS. 1-3, persons skilled in the art will understand that any system configured to implement the method steps, in any order, falls within the scope of the present invention. As discussed above, the input image can be an individual input image or can be a frame identified from an input video or video segment.

As shown, a method 500 begins at step 502, where banding detection application 120 performs one or more pre-processing operations on an input image. Performing the one or more pre-processing operations on the input image is performed in a manner similar to that disclosed above with respect to pre-processing engine 126. In some embodiments, the one or more pre-processing operations include one or more of: extracting a luma component from the input image; converting the bit-depth of the input image to a target bit-depth; applying a low-pass filter to the input image; or upscaling the image to a target image resolution.

At step 504, banding detection application 120 generates, based on the processed input image, a confidence map associated with a specific intensity difference value and a specific image scale. Generating the confidence map is performed in a manner similar to that disclosed above with respect to confidence engine 130. In some embodiments, generating the confidence map includes computing, for each pixel in the processed input image, a banding confidence value associated with the pixel based on the specific intensity difference value and the specific image scale.

In some embodiments, generating the confidence map includes generating a spatial mask based on the processed input image and applying the spatial mask to the processed input image to generate a filtered image. Banding detection application 120 generates the confidence map based on the filtered image.

In some embodiments, generating the confidence map includes applying luminance masking to the processed input image. The banding detection application 120 determines, for each pixel of the processed input image at the specific intensity level, whether the pixel contributes to perceived banding. If the pixel does not contribute to perceived banding, then the banding confidence value associated with the pixel is adjusted to 0.

At step 506, if additional intensity levels remain, then the method returns to step 504 where a confidence map associated with a next intensity level is generated. As discussed above, in some embodiments, for each image scale, a confidence map is generated for intensity difference values of 1, 2, 3, and 4, respectively. Step 504 is repeated for the specific image scale and each of intensity difference values 1, 2, 3, and 4. If a confidence map has been generated for every specified intensity level, then the method proceeds to step 508.

At step 508, if additional image scales remain, then the method proceeds to step 510. At step 510, banding detection application 120 downscales the processed input image. In some embodiments, downscaling the processed input image includes decimating the processed input image by a specific factor (e.g., 2). The method returns to step 504, where a confidence map is generated for the processed input image at a next image scale.

As discussed above, in some embodiments, a set of confidence maps are generated for image scales of 2160p, 1080p, 540p, 270p, and 135p. Steps 504-510 are repeated for each of the different image scales. If the image is at the smallest image scale and no additional image scales remain, then the method proceeds to step 512.

At step 512, banding detection application 120 generates a banding index corresponding to the input image based on the plurality of confidence maps generated by the iteration(s) of step 504 described above. Generating the banding index based on the plurality of confidence maps is performed in a manner similar to that disclosed above with respect to spatial pooling engine 134. In some embodiments, banding detection application 120 computes the banding index based on averaging the banding confidence values of pixels that have the highest banding confidence values across each confidence map of the plurality of confidence maps. In some embodiments, the banding detection application 120 computes a banding index corresponding to each specific image scale based on the confidence maps corresponding to the specific image scale. The banding detection application 120 computes the banding index corresponding to the input image based on the banding indices for the plurality of image scales. Banding detection application 120 stores the banding index in memory and/or transmits the banding index to any number of software applications for future use. In some embodiments, banding detection application 120 performs the method 500 for a plurality of frames corresponding to an input video (e.g., input frames 124(1)-(M) of input video 102) and uses the banding indices generated for the plurality of input frames to generate a video banding index 150 for the input video.

Computing Device Overview

Figure 6:
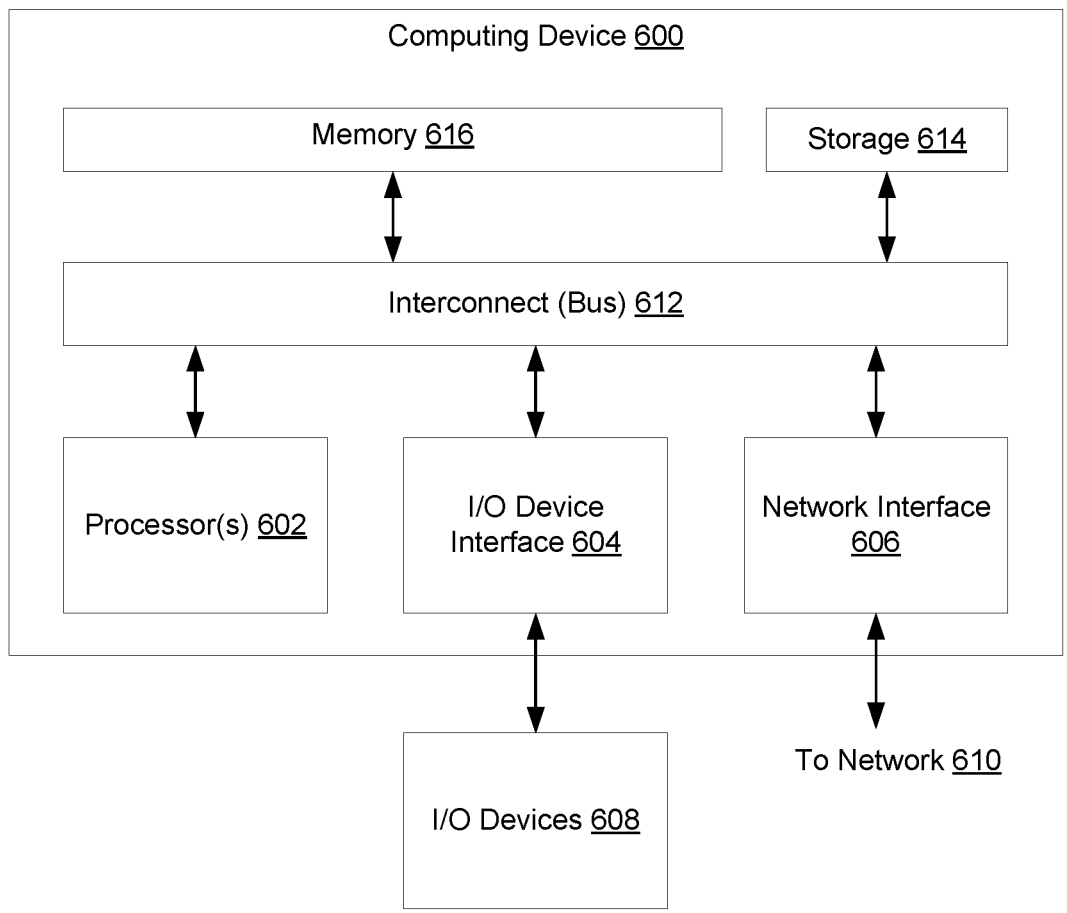
FIG. 6 is a conceptual illustration of a computing device configured to implement one or more aspects of the various embodiments.

FIG. 6 is a conceptual illustration of a computing device 600 configured to implement one or more aspects of the present invention. As shown, computing device 600 includes an interconnect (bus) 612 that connects one or more processing units 602, an input/output (I/O) device interface 604 coupled to one or more input/output (I/O) devices 608, memory 616, a storage 614, and a network interface 606. In various embodiments, one or more computing instances 110 can be implemented across one or more of the illustrated computing device 600.

Computing device 600 includes a server computer, a desktop computer, a laptop computer, a smart phone, a personal digital assistant (PDA), tablet computer, or any other type of computing device configured to receive input, process data, and optionally display images, and is suitable for practicing one or more embodiments. Computing device 600 described herein is illustrative and that any other technically feasible configurations fall within the scope of the present disclosure.

Processing unit(s) 602 includes any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processing unit(s) 602 may be any technically feasible hardware unit capable of processing data and/or executing software applications. Further, in the context of this disclosure, the computing elements shown in computing device 600 may correspond to a physical computing system (e.g., a system in a data center) or may be a virtual computing instance executing within a computing cloud.

In one embodiment, I/O devices 608 include devices capable of providing input, such as a keyboard, a mouse, a touch-sensitive screen, and so forth, as well as devices capable of providing output, such as a display device. Additionally, I/O devices 608 may include devices capable of both receiving input and providing output, such as a touchscreen, a universal serial bus (USB) port, and so forth. I/O devices 608 may be configured to receive various types of input from an end-user (e.g., a designer) of computing device 600, and to also provide various types of output to the end-user of computing device 600, such as displayed digital images or digital videos or text. In some embodiments, one or more of I/O devices 608 are configured to couple computing device 600 to a network 610.

Network 610 includes any technically feasible type of communications network that allows data to be exchanged between computing device 600 and external entities or devices, such as a web server or another networked computing device. For example, network 610 may include a wide area network (WAN), a local area network (LAN), a wireless (WiFi) network, and/or the Internet, among others.

Storage 614 includes non-volatile storage for applications and data, and may include fixed or removable disk drives, flash memory devices, and CD-ROM, DVD-ROM, Blu-Ray, HD-DVD, or other magnetic, optical, or solid-state storage devices.

Memory 616 includes a random-access memory (RAM) module, a flash memory unit, or any other type of memory unit or combination thereof. Processing unit(s) 602, I/O device interface 604, and network interface 606 are configured to read data from and write data to memory 616. Memory 616 includes various software programs that can be executed by processor(s) 602 and application data associated with said software programs.

In sum, the disclosed techniques enable detecting banding artifacts in an image or a video. A plurality of banding confidence maps are generated for the image. Each banding confidence map indicates a banding confidence for the pixels in the image based on a different intensity difference value and at different image resolution. The banding confidence for a pixel is computed based on the perceived contrast between the pixel and its neighboring pixels. For each intensity difference value, the banding confidence of the pixel indicates a number of neighboring pixels where the intensity of the neighboring pixel differs from the intensity of the pixel by an amount equal to the intensity difference value.

A banding index corresponding to the image is generated based on the plurality of banding confidence maps. The banding index predicts an amount of banding visible in the image. To generate a banding index for a video or video segment, a banding index is generated for each frame of a plurality of frames of the video or video segment. For example, a banding index can be generated for one frame for every 0.5 seconds of the video or video segment. A banding index corresponding to the video or video segment is generated based on the banding indices of the plurality of frames.

At least one technical advantage of the disclosed techniques relative to the prior art is that, with the disclosed techniques, banding in an image is detected with greater accuracy compared to prior art techniques. In particular, contrast detection is used to identify banding that is visible to human viewers but is not detectible using false edge detection techniques or false segment detection techniques. Further, the results generated by the disclosed techniques include fewer banding that is not visible to human viewers and/or visual image elements that are unrelated to banding artifacts. Accordingly, the disclosed techniques produce both fewer false positives and fewer false negatives relative to conventional techniques. These technical advantages provide one or more technological advancements over prior art approaches.

1. In some embodiments, a computer-implemented method for detecting banding in images comprises generating a first set of pixel confidence values based on a first intensity difference value and first image scale associated with a first image, wherein each pixel confidence value included in the first set of pixel confidence values indicates a likelihood that a corresponding pixel included in the first image at the first image scale corresponds to banding in the first image; and generating a banding index corresponding to the first image based on the first set of pixel confidence values.

2. The computer-implemented method of clause 1, wherein generating the first set of pixel confidence values comprises performing one or more pre-processing operations on the first image to generate a processed image; and generating the first set of pixel confidence values based on the processed image.

3. The computer-implemented method of clauses 1 or 2, wherein the one or more pre-processing operations include at least one of extracting a luma component from the first image, converting the first image to a target image bit-depth, applying a low-pass filter to the first image, or upscaling the first image to a target image resolution.

4. The computer-implemented method of any of clauses 1-3, wherein generating the first set of pixel confidence values comprises generating a spatial mask based on the first image; applying a mode filter to the first image to generate a mode filtered image; applying the spatial mask to the mode filtered image to generate a filtered image; and generating the first set of pixel confidence values based on the filtered image.

5. The computer-implemented method of any of clauses 1-4, wherein generating the first set of pixel confidence values comprises determining, for one or more pixels included in the first image, a contrast value associated with the pixel; and generating, for each pixel confidence value of one or more pixel confidence values included in the first set of pixel confidence values, the pixel confidence value based on whether the contrast value associated with the corresponding pixel in the first image is less than a threshold value.

6. The computer-implemented method of any of clauses 1-5, further comprising generating a second set of pixel confidence values based on a second intensity difference value and the first image scale, wherein each pixel confidence value included in the second set of pixel confidence values indicates a likelihood that the corresponding pixel included in the first image at the first image scale corresponds to banding in the first image; and wherein generating the banding index is further based on the second set of pixel confidence values.

7. The computer-implemented method of any of clauses 1-6, further comprising performing one or more downscaling operations on the first image to generate a downscaled image associated with a second image scale; and generating a second set of pixel confidence values based on the first intensity difference value and the second image scale, wherein each pixel confidence value included in the second set of pixel confidence values indicates a likelihood that the corresponding pixel included in the downscaled image at the second image scale corresponds to banding in the first image; and wherein generating the banding index is further based on the second set of pixel confidence values.

8. The computer-implemented method of any of clauses 1-7, wherein generating the banding index is based on a selected subset of pixel confidence values included in the first set of pixel confidence values.

9. The computer-implemented method of any of clauses 1-8, wherein generating the banding index comprises generating a first image scale banding index based on the first set of pixel confidence values; generating a second image scale banding index based on the second set of pixel confidence values; and generating the banding index based on the first image scale banding index and the second image scale banding index.

10. The computer-implemented method of any of clauses 1-9, wherein the first image is included in a video, and the banding index corresponding to the first image is used to generate a banding index corresponding to the video.

11. In some embodiments, one or more non-transitory computer-readable media include instructions that, when executed by one or more processors, cause the one or more processors to perform the steps of generating a first set of pixel confidence values based on a first intensity difference value and first image scale associated with a first image, wherein each pixel confidence value included in the first set of pixel confidence values indicates a likelihood that a corresponding pixel included in the first image at the first image scale corresponds to banding in the first image; and generating a banding index corresponding to the first image based on the first set of pixel confidence values.

12. The one or more non-transitory computer-readable media of clause 11, wherein generating the first set of pixel confidence values comprises performing one or more pre-processing operations on the first image to generate a processed image; and generating the first set of pixel confidence values based on the processed image.

13. The one or more non-transitory computer-readable media of clauses 11 or 12, wherein the one or more pre-processing operations include at least one of extracting a luma component from the first image, converting the first image to a target image bit-depth, applying a low-pass filter to the first image, or upscaling the first image to a target image resolution.

14. The one or more non-transitory computer-readable media of any of clauses 11-13, wherein generating the first set of pixel confidence values comprises: generating a spatial mask based on the first image; applying a mode filter to the first image to generate a mode filtered image; applying the spatial mask to the mode filtered image to generate a filtered image; and generating the first set of pixel confidence values based on the filtered image.

15. The one or more non-transitory computer-readable media of any of clauses 11-14, wherein generating the first set of pixel confidence values comprises computing, for each pixel included in the first image, a respective pixel confidence value based on the first intensity value and the first image scale.

16. The one or more non-transitory computer-readable media of any of clauses 11-15, wherein computing the respective pixel confidence value is further based on whether a contrast value associated with the corresponding pixel in the first image is less than a threshold value.

17. The one or more non-transitory computer-readable media of any of clauses 11-16, wherein computing the respective pixel confidence value comprises determining, for each neighboring pixel of a plurality of neighboring pixels, whether an intensity of the pixel and an intensity of the neighboring pixel differs by the first intensity value.

18. The one or more non-transitory computer-readable media of any of clauses 11-17, further comprising determining the plurality of neighboring pixels based on a size of the first image.

19. The one or more non-transitory computer-readable media of any of clauses 11-18, wherein the first image is included in a video, and the banding index corresponding to the first image is used to generate a banding index corresponding to the video.

20. In some embodiments, a system comprises one or more memories storing instructions; and one or more processors that are coupled to the one or more memories and, when executing the instructions, perform the steps of generating a first set of pixel confidence values based on a first intensity difference value and first image scale associated with a first image, wherein each pixel confidence value included in the first set of pixel confidence values indicates a likelihood that a corresponding pixel included in the first image at the first image scale corresponds to banding in the first image; and generating a banding index corresponding to the first image based on the first set of pixel confidence values.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for detecting banding in images, the method comprising:
   generating a first set of pixel confidence values based on a first intensity difference value and a first pixel resolution associated with a first image, wherein each pixel confidence value included in the first set of pixel confidence values indicates a likelihood that a corresponding pixel included in the first image at the first pixel resolution corresponds to banding in the first image;
   performing one or more downscaling operations on the first image to generate at least one downscaled image that is associated with at least one pixel resolution that is lower than the first pixel resolution;
   performing one or more pixel intensity comparison operations on one or more pixels included in the at least one downscaled image to generate at least a second set of pixel confidence values; and
   generating a banding index corresponding to the first image based on the first set of pixel confidence values and the at least a second set of pixel confidence values.

2. The computer-implemented method of claim 1, wherein generating the first set of pixel confidence values comprises:
   performing one or more pre-processing operations on the first image to generate a processed image; and
   generating the first set of pixel confidence values based on the processed image.

3. The computer-implemented method of claim 2, wherein the one or more pre-processing operations include at least one of extracting a luma component from the first image, converting the first image to a target image bit-depth, applying a low-pass filter to the first image, or upscaling the first image to a target image resolution.

4. The computer-implemented method of claim 1, wherein generating the first set of pixel confidence values comprises:
   generating a spatial mask based on the first image;
   applying a mode filter to the first image to generate a mode filtered image;
   applying the spatial mask to the mode filtered image to generate a filtered image; and
   generating the first set of pixel confidence values based on the filtered image.

5. The computer-implemented method of claim 1, wherein generating the first set of pixel confidence values comprises:

determining, for one or more pixels included in the first image, a contrast value associated with the pixel; and generating, for each pixel confidence value of one or more pixel confidence values included in the first set of pixel confidence values, the pixel confidence value based on whether the contrast value associated with the corresponding pixel in the first image is less than a threshold value.

6. The computer-implemented method of claim 1, further comprising:

generating a second set of pixel confidence values based on a second intensity difference value and the first pixel resolution, wherein each pixel confidence value included in the second set of pixel confidence values indicates a likelihood that the corresponding pixel included in the first image at the first pixel resolution corresponds to banding in the first image; and wherein generating the banding index is further based on the second set of pixel confidence values.

7. The computer-implemented method of claim 1, wherein generating the banding index is based on a selected subset of pixel confidence values included in the first set of pixel confidence values.

8. The computer-implemented method of claim 1, wherein generating the banding index comprises:

generating a first pixel resolution banding index based on the first set of pixel confidence values;

generating a second pixel resolution banding index based on a second set of pixel confidence values that is generated by performing the one or more pixel intensity comparison operations on one or more pixels included in a downscaled image having a second pixel resolution; and generating the banding index based on the first pixel resolution banding index and the second pixel resolution banding index.

9. The computer-implemented method of claim 1, wherein the first image is included in a video, and the banding index corresponding to the first image is used to generate a banding index corresponding to the video.

10. One or more non-transitory computer-readable media including instructions that, when executed by one or more processors, cause the one or more processors to perform the steps of:

generating a first set of pixel confidence values based on a first intensity difference value and a first pixel resolution associated with a first image, wherein each pixel confidence value included in the first set of pixel confidence values indicates a likelihood that a corresponding pixel included in the first image at the first pixel resolution corresponds to banding in the first image;

performing one or more downscaling operations on the first image to generate at least one downscaled image that is associated with at least one pixel resolution that is lower than the first pixel resolution;

performing one or more pixel intensity comparison operations on one or more pixels included in the at least one downscaled image to generate at least a second set of pixel confidence values; and generating a banding index corresponding to the first image based on the first set of pixel confidence values and the at least a second set of pixel confidence values.

11. The one or more non-transitory computer-readable media of claim 10, wherein generating the first set of pixel confidence values comprises:

performing one or more pre-processing operations on the first image to generate a processed image; and generating the first set of pixel confidence values based on the processed image.

12. The one or more non-transitory computer-readable media of claim 11, wherein the one or more pre-processing operations include at least one of extracting a luma component from the first image, converting the first image to a target image bit-depth, applying a low-pass filter to the first image, or upscaling the first image to a target image resolution.

13. The one or more non-transitory computer-readable media of claim 10, wherein generating the first set of pixel confidence values comprises:

generating a spatial mask based on the first image;

applying a mode filter to the first image to generate a mode filtered image;

applying the spatial mask to the mode filtered image to generate a filtered image; and generating the first set of pixel confidence values based on the filtered image.

14. The one or more non-transitory computer-readable media of claim 10, wherein generating the first set of pixel confidence values comprises:

computing, for each pixel included in the first image, a respective pixel confidence value based on the first intensity value and the first pixel resolution.

15. The one or more non-transitory computer-readable media of claim 14, wherein computing the respective pixel confidence value is further based on whether a contrast value associated with the corresponding pixel in the first image is less than a threshold value.

16. The one or more non-transitory computer-readable media of claim 14, wherein computing the respective pixel confidence value comprises:

determining, for each neighboring pixel of a plurality of neighboring pixels, whether an intensity of the pixel and an intensity of the neighboring pixel differs by the first intensity value.

17. The one or more non-transitory computer-readable media of claim 16, further comprising determining the plurality of neighboring pixels based on a size of the first image.

18. The one or more non-transitory computer-readable media of claim 10, wherein the first image is included in a video, and the banding index corresponding to the first image is used to generate a banding index corresponding to the video.

19. A system comprising:

one or more memories storing instructions; and one or more processors that are coupled to the one or more memories and, when executing the instructions, perform the steps of:

generating a first set of pixel confidence values based on a first intensity difference value and a first pixel resolution associated with a first image, wherein each pixel confidence value included in the first set of pixel confidence values indicates a likelihood that a corresponding pixel included in the first image at the first pixel resolution corresponds to banding in the first image;

performing one or more downscaling operations on the first image to generate at least one downscaled image that is associated with at least one pixel resolution that is lower than the first pixel resolution;

performing one or more pixel intensity comparison operations on one or more pixels included in the at least one downscaled image to generate at least a second set of pixel confidence values; and generating a banding index corresponding to the first image based on the first set of pixel confidence values and the at least a second set of pixel confidence values.

\* \* \* \* \*